E. ALLEN.

Revolver.

No. 633. Reissued Dec. 14, 1858.

N. PETERS, PHOTO-LITHOGRAPHER, WASHINGTON, D. C.

UNITED STATES PATENT OFFICE.

ETHAN ALLEN, OF WORCESTER, MASSACHUSETTS.

IMPROVEMENT IN PISTOLS AND OTHER FIRE-ARMS.

Specification forming part of Letters Patent No. 3,998, dated April 16, 1845; Reissue No. 633, dated December 14, 1858.

*To all whom it may concern:*

Be it known that I, ETHAN ALLEN, of the city and county of Worcester, State of Massachusetts, have invented certain new and useful Improvements in Locks for Pistols and various other Fire-Arms, of the construction and operation of which the following description and accompanying drawings, taken together, constitute a full and exact specification.

Figure 1:
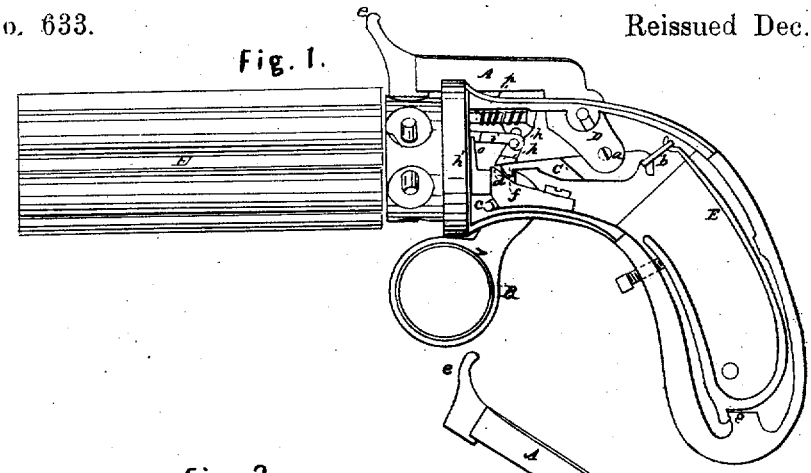

Of the drawings above mentioned, Figure 1 represents what is usually termed a "revolving pistol," having the cover of the breech or handle removed, for the purpose of exhibiting the internal arrangement and construction of the operative parts of the lock. Such other figures as may be necessary to a full understanding of the several parts will be hereinafter referred to and described.

In Fig. 1, *a* represents the percussion-hammer, B the trigger, C the dog or catch which connects the upper part of the trigger with the tumbler D of the hammer or cock, and E the mainspring.

In the lock heretofore patented by me the dog or catch was jointed at one of its rear ends directly to the lower end of the tumbler of the percussion-hammer, and was forced down upon the cam and notch of the upper part of the sear of the trigger, by means of a small spring attached to the tumbler of the hammer and exerting its force upon the upper side of the dog or catch. The trigger was also forced or thrown forward by another spring, usually denominated the "trigger-spring." The office of the mainspring was to throw the hammer down upon the percussion-cap whenever the dog or catch was relieved or thrown up above and out of the notch of the trigger. Thus it will be seen that three springs were employed and considered necessary to the complete action of the locks. I now dispense with two of the said springs, and make use of the mainspring only to perform their respective offices, thus having but one spring in the action of that part of the lock which elevates and throws down the percussion-hammer.

Figure 2:
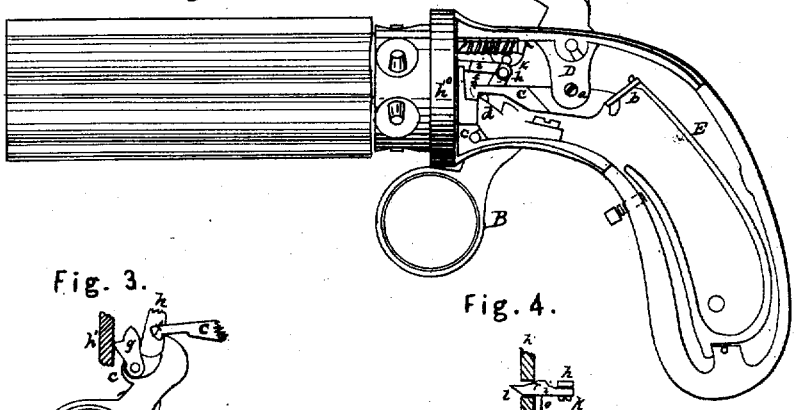
Figure 3:
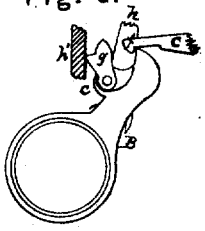

In order to effect the above improvement, the dog or catch C is jointed to the rear end of the tumbler D of the percussion-hammer, at point near its rear end, the fulcrum or joint-pin on which it works being seen at *a;* and instead of connecting or jointing the upper end of the mainspring directly to the tumbler or rear end of the percussion-hammer, as heretofore, it is now jointed or connected by a loop, *b*, or other analogous contrivance, directly to the rear end of the dog or catch as seen in the drawings. The power of the mainspring is therefore exerted, both upon the cock or hammer and upon the rear end of dog or catch, in such manner as to lift it, and thereby force the front end of the said dog or catch down upon the upper part of the sear of the trigger, or, in other words, down upon or toward the cam and notch thereof. The trigger turns upon a joint pin or fulcrum, *c*, which is placed somewhat in advance of the point of bearing of the front edge of the dog or catch upon the trigger-sear, and thus the force of the mainspring is exerted through the dog or catch upon the trigger-sear in such manner as to depress the same, and thereby throw the lower end of the trigger forward when necessary. I also make the dog or catch somewhat wider than, or about double, the width of the sear of the trigger, and arrange the same over the sear in such manner that the front side of the dog or catch may project beyond the front side of the sear about one-half the width of the dog, and by the side and in front of the trigger sear and below and in advance of the said projecting part of the dog or catch, I arrange a small angular stud, *d*, as seen in Fig. 1, the object of the said stud being to enable a person to cock the hammer as is done in ordinary locks, and this is accomplished by applying a finger to front end, *e*, of the percussion-hammer with force sufficient to elevate the hammer and throw the hook of the dog or catch forward and over and down upon the angular front end of the stud, as represented in Fig. 2, which denotes the hammer as cocked. On pulling the trigger, the cam of the sear elevates the dog and disconnects it with the stud, and permits it to descend upon the nipple in the ordinary manner. Directly in front of the notch an angular part of the sear of the trigger on which the dog hooks a small thin piece of metal, *g*, is arranged and jointed to the sear in such manner at its lower end as to allow of its upper end vibrating or moving forward and backward, the same being as represented in Fig. 3, which denotes the trigger-sear, the piece *g*, and the dog or catch in the position they assume when the lower end of the trigger is thrown completely forward. On pulling back the lower end of the trigger the upper end of the piece *g* is thrown or brought against the front part, *h'*, of the case of the lock, thus causing the rear curved portion of the upper part of the piece *g* to come into contact with and force upward the curved end of the dog or catch, thereby insuring the escapement of the dog or catch from the notch of the sear. The point or extreme upper end of the piece *g* should extend upward high enough to permit the hooked end of the dog to come into contact with it the next time, or when the sear of the trigger retreats, and to force it forward as the hooked end of the dog descends over and into the notch of the sear.

The mode heretofore adopted for the purpose of revolving the series of barrels has been by means of a long lever placed against the inner side of the lock-case and turning on a fulcrum at its (the lever's) rear end, and being jointed between its two ends to the sear of the trigger, so that when the trigger was pulled the front end of the lever would be thrown upward and would act against one of a series of teeth projecting from the common breech of the barrels in such manner as to turn the series of barrels on their common axis the distance required. The force by which the trigger was retracted being withdrawn, the rear part of the trigger-sear would descend, carrying with it the lever, which slipped back a little and passed at its front end underneath the succeeding tooth of the series upon the breech of the barrels.

Figure 4:
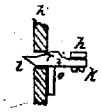
Figure 5:
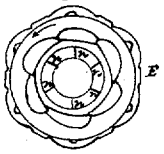
Figure 7:
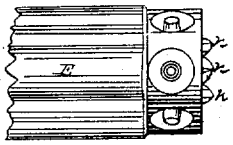
Figure 6:
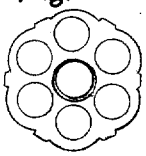

The progressive revolution of the barrels I effect by other and simpler means, as follows: To the top of a small projection, *h*, extending upward from the front part of the sear of the trigger, a small pitman, *i*, is jointed so as to move upon a joint pin or fulcrum, *k*, and so that its front end may play loosely a little laterally. The said pitman passes and slides back and forth in the direction of its length through a small orifice, *m*, formed through the front part, *h'*, of the lock-case, and the front end of the said pitman is beveled off or made cam-shaped, as seen at *l* in Fig. 4, which denotes a top view of it. Fig. 5 represents a view of the rear end of the cylinder of barrels E, and Fig. 6 a view of the front end thereof. Fig. 7 is a top view of the end of the cylinder E.

By inspection of Figs. 5 and 7 it will be perceived that a series of angular teeth, *n n* and *c*, are arranged around in a circle upon the rear end of the cylinder of barrels, the same being in such manner as to act in connection with the pitman aforesaid; and it is intended that whenever the pitman is forced forward the beveled part of the front end shall meet or be thrown against the inclined or beveled side of one of the teeth *n*, and as it (the pitman) progresses forward it shall be itself thrown a little toward the left by a cam or inclined plane, *r*, formed upon its rear side, coming in contact with the right side of the orifice *m*, and thereby so press against the tooth as to cause the cylinder of barrels to turn upon its axis to the degree required to bring another barrel and its percussion-cap under the action of the hammer or cock when it descends. The back movement of the top of the trigger-sear retracts the pitman so that its front end is carried back entirely and just beyond the succeeding tooth *n*, the barrels, when the pistol is held by the stock in the hands and so as to point the muzzles of them from the body, being supposed to revolve in the direction denoted by the arrow in Fig. 5. The moment this action of the pitman takes place a small spring, *o*, acts in such manner as to throw the front end of the pitman laterally toward the right far enough to permit the beveled end of the pitman at its next forward movement to come into contact with the inclined side of the tooth against which it is impelled, and thereby turn the cylinder so as to bring the nipple of another barrel under the action of the hammer, and so on. Each barrel, having its tooth *n*, is turned or moved around in succession. The barrels are held in position, at each stroke of the hammer or cock by means of a spring-bolt, *p*, arranged and operating in the usual manner.

Having therefore explained my improved pistol, I shall claim—

1. Extending the rear end of the dog or catch C rearward and beyond where it is jointed to the tumbler of the percussion-hammer and connecting the upper end of the mainspring directly to the part so extended, or otherwise connecting the mainspring to the dog so as to cause it to operate upon the hammer, dog, and trigger, substantially as described, the same being for the purpose hereinbefore specified.

2. The arrangement of a mechanism in connection with a self-cocking arrangement, whereby I am enabled to make the fire-arm so as to be cocked at pleasure by the hammer or to be operated entirely by the trigger as a self-cocker, said mechanism consisting of the stud *d* and the dog or catch C in connection with the tumbler, as described, or their equivalents, whereby the same results are obtained.

3. The piece of metal *g*, as combined with or applied to the sear of the trigger and in front of the notch thereof and hook of the catch C and operating upon and in relation thereto in the manner and for the purpose as hereinbefore explained.

4. My new and peculiar arrangement of the pitman upon the sear of the trigger, so as to operate as above described in combination with the construction and arrangement of the teeth upon the breech or rear end of the cylinder or series of barrels, by which improvement in constructing and arranging the aforesaid parts I am enabled to very much simplify them in comparison with the manner in which they have heretofore been made and disposed.

In testimony whereof I have hereto set my signature in presence of two witnesses.

ETHAN ALLEN.

Witnesses:

SAML. A. ARNOLD,
JAS. G. ARNOLD.